United States Patent [19]  [11] 4,263,927
Wilski et al.  [45] Apr. 28, 1981

[54] PROCESS USING POLYACRYLAMIDE DRAG REDUCING AGENT IN THE FORM OF AN AQUEOUS JELLY

[75] Inventors: Hans Wilski, Bad Soden am Taunus; Werner Interthal, Rüsselsheim; Günter Gruber, Frankfurt am Main; Gerhard Slebos, Hamburg, all of Fed. Rep. of Germany

[73] Assignee: Hoechst Aktiengesellschaft, Frankfurt am Main, Fed. Rep. of Germany

[21] Appl. No.: 13,183

[22] Filed: Feb. 21, 1979

[30] Foreign Application Priority Data

Feb. 23, 1978 [DE] Fed. Rep. of Germany ....... 2807709

[51] Int. Cl.³ .............................................. F17D 1/16
[52] U.S. Cl. .................................. 137/13; 252/313 R; 252/313 S; 252/316; 406/197
[58] Field of Search ...................... 252/313 R; 137/13; 406/197

[56] References Cited

U.S. PATENT DOCUMENTS 3,524,682  8/1970  Booth .............................. 406/197 X
3,842,013  10/1974  Booth .................................. 252/315
3,868,997  3/1975  Pogers ............................... 137/13 X

FOREIGN PATENT DOCUMENTS

1317408  5/1973  United Kingdom .............. 260/29.2 N

Primary Examiner—Richard D. Lovering
Attorney, Agent, or Firm—Connolly and Hutz

[57] ABSTRACT

The frictional drag of aqueous liquids and suspensions in turbulent or pulsating flow is reduced by adding 1 to 1,000 ppm of a polyacryl amide or partially saponified polyacryl amide obtained in its manufacturing process in the form of an aqueous, dimensionally stable jelly which has retained its solubility in water and is capable of being cut.

9 Claims, 5 Drawing Figures

PROCESS USING POLYACRYLAMIDE DRAG REDUCING AGENT IN THE FORM OF AN AQUEOUS JELLY

It is generally known that liquids with turbulent flow are subject to frictional drag along the limiting walls. It is also known that this frictional drag can be reduced by adding small amounts of certain substances. In the English language substances reducing the frictional drag are named "drag reducing agents" while in the German language substances of this type are designated "Strömungsbeschleuniger" (cf. E. Dschagarowa and G. Mennig, Rheologica Acta 14, 1089 (1975) and the literature cited therein). A drag reducing agent is thus a substance that accelerates the flow when added in a small amount to a liquid with turbulent or pulsating flow, with otherwise identical conditions. Drag reducing agents make it possible to convey with a given pump a larger amount of liquid through a given pipe.

In many cases this fact alone constituted an industrial profit, for example, when normally a pipe is operated with full rate of utilization and at certain times a peak consumption is to be conveyed. In view of the fact that with a given pump capacity a larger amount of liquid can be conveyed with the use of a drag reducing agent (in the following designated by the abbreviation DRA), the saving of energy resulting therefrom also means a technical advantage in many cases. Finally, in a case where the throughput shall not be increased, the pressure loss can be reduced or pipes of smaller diameter can be used when DRAs are added. By these measures the economy of operation of a pipe can be improved.

Various compounds have been proposed as DRAs. In this connection there is mentioned a series of high molecular weight compounds, for example polyisobutylene (A. Ram, E. Finkelstein and C. Elata, I & EC Process Design and Development 6, No. 3, 309 (1067) or various polyacrylates and polystyrene derivatives (DE-AS No. 2,056,700), which are added to liquid hydrocarbons as DRAs. As DRA for water, for example polyethylene oxide has been described in literature and also polyacryl amides (BHRA Fluid Engineering ISBNO 900 983 71x 1977, pages B 3-37 to 3-50 and Journal of Applied Polymer Science, volume 18 (1974), pages 3403 to 3421). The use of polyacryl amides to prevent aqueous suspensions from separating and depositing (solids/water mixtures) has been described in U.S. Pat. No. 3,524,682.

Experiments to use the aforesaid compound as well as other compounds described in the relevant literature as DRAs on an industrial scale for aqueous liquids or suspensions revealed that all these compounds have serious drawbacks. To begin with, all liquids that are insoluble or insufficiently soluble in water are unsuitable for aqueous liquids, such as polyisobutylene. Polyethylene oxide mentioned above, which, per se, has a good flow accelerating effect, is rapidly decomposed and rendered inefficient in turbulent flow, especially with high shearing gradients (for example in pumps and nozzles). Hence, this polymer is unsuitable for prolonged use or with high shearing gradients. The polyacryl amides hitherto used are likewise good DRAs, but their efficiency and stability to shearing leave much to be desired as shown in detail in the following examples.

Surprisingly, it has now been found that unlike the known polyacryl amides and partially saponified polyacryl amides, very definite, selected polyacryl amides and partially saponified products thereof exhibit special advantages when used as DRA in aqueous media. These polyacryl amides that may be partially saponified are obtained in their manufacturing process, without having lost their solubility in water, in the form of an aqueous, dimensionally stable jelly capable of being cut. It has been found that products of this type are distinctly superior in their effect and their shearing stability to all DRAs hitherto known. The fact that the polyacryl amides and partially saponified polyacryl amides are obtained in their manufacturing process in the form of jelly is an essential feature of these products as to their suitability as DRAs. The expression "jelly" in the sense of the present invention is intended to mean a rubber-like mass which is generally transparent and does not change its shape when lying at 20° C. on a flat surface. In other words, the jelly does not diverge like a highly viscous solution. In contradistinction to a highly viscous solution, the jelly can be cut with a knife and its properties resemble those of a rubber.

It is, therefore, the object of the present invention to provide a process for reducing the friction pressure drop of aqueous liquids and suspensions in turbulent or pulsating flow by adding from 1 to 1,000 ppm of a polyacryl amide as DRA which comprises using as DRA a polyacryl amide or partially saponified polyacryl amide obtained in its manufacturing process in the form of an aqueous, dimensionally stable jelly which has retained its solubility in water and is capable of being cut.

In accordance with the invention it is preferred to use as DRA a polyacryl amide or a partially saponified polyacryl amide obtained in the manufacturing process in the form of a jelly which, when spread on a steel plate in a layer thickness of 1 cm, has an elastic resilience of over 5% up to about 80%, preferably 25 to 45%, in the falling ball test with a steel ball having a diameter of 5 mm.

The polyacryl amides or partially saponified polyacryl amides to be used according to the invention and obtained in the form of a jelly are produced by known polymerization processes, but without stirring and using monomer solutions of definite concentrations and operating within definite temperature ranges. In general, the desired products are manufactured by polymerizing an about 15 to 30% by weight, preferably 20 to 25% by weight, aqueous solution of acryl amide with the addition of a suitable catalyst and, for making a partially saponified polyacryl amide with the addition of alkalies. The polymerization is carried out without stirring at an initial temperature of from about 10° to 30° C. During the course of polymerization the temperature in the reaction mixture increases to about 70° to about 98° C. and it is maintained in this range, preferably at about 80° to 95° C., until the reaction is complete. When the reaction is complete, the polymer is obtained in the form of a dimensionally stable jelly which, for use as DRA, is dissolved in water, suitably after comminution. Catalysts suitable for the manufacture of the polymers to be used according to the invention are per-compounds which decompose into radicals under the reaction compounds and thus initiate polymerization. Per-compounds of this type are, for example, peroxides such as hydrogen peroxide, dibenzoyl peroxide, tert.butyl hydroperoxide, cumene hydroperoxide and methyl ethyl ketone peroxide. Peroxidisulfates, for example potassium, sodium and ammonium peroxidisulfate are also suitable. Especially suitable catalysts are redox systems, for example peroxidisulfate/pyrosulfate, peroxidisulfate/formaldehyde sulfoxylate and persulfate/sulfinic acids. The polymers to be used according to the invention are preferably produced with initiator systems as described in DE-OS No. 2,128,009.

A device for the continuous manufacture of the polymers to be used according to the invention is described in British Pat. No. 1,317,408.

By adding alkalies, for example sodium or potassium hydroxide, sodium or potassium carbonate and/or by operating under elevated pressure the acid amide groups are partially saponified in the polymerization to carboxylic acid groups. The desired degree of saponification of the polyacryl amides can be regulated by the amount of alkali added. In the most simple case, the acid amide groups are saponified with an approximately stoichiometric amount of alkali added. For use as drag reducing agents partially saponified polyacryl amides are preferred. Their degree of saponification is in the range of from about 5 to 90% by weight, preferably 20 to 40% by weight.

The polymeric jelly to be used according to the invention can be further characterized in simple manner by its resilience. The resilience is the proportion of recovered to spent work or, in the falling ball test which is very simple to carry out, the proportion of the rebound height of a steel ball to its falling height (cf. K. Memmler, Handbuch der Kautschuk-Wissenschaft, 1930, pages 640 et seq.). It has been ascertained that for use as DRA polyacryl amides or partially saponified polyacryl amides are suitable which are obtained in their manufacturing process in the form of a jelly which, when applied to a steel plate in a layer thickness of 1 cm, has a resilience of greater than 5% and preferably of from 25 to 45% in the falling ball test. Commercial polyacryl amides or partially saponified polyacryl amides which are generally obtained by polymerization in suspension or in non-aqueous solvents and which are not obtained in the form of a jelly having the characteristic resilience are unsuitable or less suitable as DRAs than the products to be used according to the invention.

Figure 2:
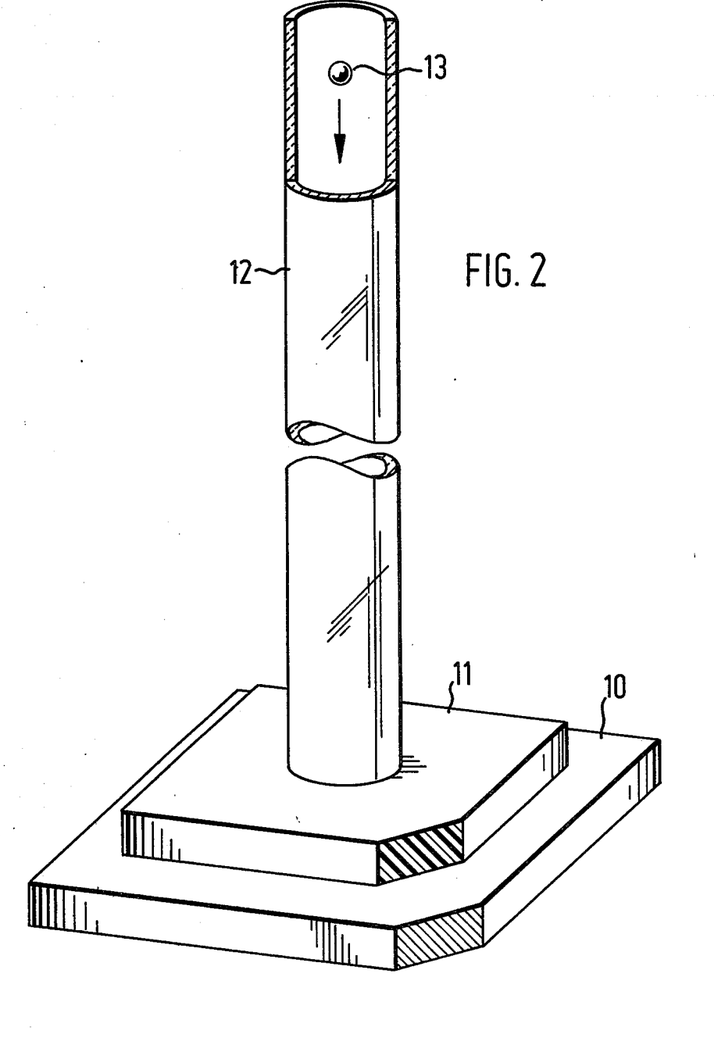
FIG. 2 is a three-dimensional view of apparatus for measuring the elastic resilience of DRAs of this invention by the falling ball test.

To measure the elastic resilience of the polymeric jelly by the falling ball test the apparatus shown in FIG. 2 is used. As 1 cm thick layer of the polymer to be tested (11) is placed on a 1 cm thick steel plate (10) and powdered with talcum. On the powdered surface a 100 cm long glass tube (12) having a diameter of 2 cm is placed and a steel ball (13) having a diameter of 5 mm is allowed to fall in the tube on the jelly. The resilience R is calculated according to the formula $$R = H_r/H_f$$

wherein $H_r$ is the rebound height and $H_f$ is the falling height. In the apparatus used the falling height is equal to 100 cm and therefore the rebound height, measured in centimeters, is equal to the resilience in percent. Polyacryl amides having too low a resilience are little suitable as DRA. It is thus desirable to use polymers having a relatively high resilience, but values exceeding about 70% are difficult to achieve.

For a better understanding of the jellies to be used as drag reducing agents, they can be comminuted in suitable devices. The jelly particles obtained in this manner can be directly used for making aqueous solutions of DRAs. To prevent the jelly particles from agglomerating they can also be powdered with a substance with poor wetting properties that is difficultly soluble or insoluble or swells in water, for example corn starch, talcum or magnesium oxide.

Alternatively, the jelly obtained by polymerization can be dried and then ground to obtain a powder. The polymers obtained in this manner either in the form of jelly particles or as a powder can be readily dissolved in water with stirring and the stock solution can then be added to the aqueous medium to reduce the friction pressure drop thereof.

The polyacryl amides or partially saponified polyacryl amides to be used as DRA are added to the flowing aqueous liquid in an amount of from about 1 to 1,000 ppm. The concentration of the DRA to be used depends, inter alia and in the first place, on the composition of the flowing aqueous liquid or suspension. In most cases, the DRA is added in an amount of from 10 to 100 ppm. The DRAs to be used according to the invention can be added not only in the form of a concentrated aqueous stock solution, which is preferred, but also in the form of aqueous suspensions or as dry powders.

The aqueous liquids or suspensions to which the DRAs are added are pure water, optionally hot water, aqueous solutions or suspensions or water-insoluble substances or substances that are sparingly soluble in water, for example sand, clay, ore or other mineral particles in water or aqueous solutions.

It has been found that a comparative evaluation of the various DRAs on the basis of the data indicated in literature is extremely difficult since the values characteristic for this evaluation, i.e. the drag reducing effect and shearing stability of the tested products substantially depend on the measuring method and the apparatus used for the measurements. Apparatus in which the solutions flow through capillaries (tubes having a diameter of from 0.2 to 2 mm) generally yield especially high values of flow acceleration. Due to the peculiarity of capillary flow these results cannot be transferred without difficulty to an industrial scale and, therefore, they are not taken into consideration. With larger apparatus, too, the measured values cannot be compared directly. This is especially the case with the determination of the shearing stability. An objective, defined technical or physical measure does not yet exist for this value. It is known, however, that in simple tube flows drag reducing agents are decomposed to a relatively small extent only. The principal decomposition takes place in the pumps. Hence, in a flow apparatus in which the liquid containing the DRA is pumped in a cycle, the decomposition is much higher because of the frequent passage through the pump than in a straight pipe. The degree of decomposition of the DRA depends on the construction of the pump. All these facts show that comparative results can only be obtained if the different products to be compared are tested in one apparatus under identical conditions. The flow apparatus used should have a certain minimum size in order that the values obtained could be transferred at least approximately to industrial dimensions. An apparatus of this type and a test carried out therewith are described in the following:

Novel features and advantages of the present invention will become apparent to one skilled in the art from a reading of the following detailed description in conjunction with the accompanying drawings wherein similar reference characters refer to similar parts and in which.

paragraph and page 3408, Table 1). The following table illustrates once more the results obtained.

| polymer dissolved in water to a concentration of 60 ppm | $\Delta P_W/\Delta P_{DRA}$ | |
|---|---|---|
| | beginning of experiment | after 400 minutes |
| polymer I produced as a jelly | 5.0 | 5.0 |
| commercial polyacryl amide (A) | 5.0 | 2.3 |
| commercial polyethylene oxide (C) | 4.4 | 1.2 |

It should be mentioned that there exists a series of drag reducing agents having a very weak effect but a relatively good shearing stability. This relatively good shearing stability is, however, of no technical advantage because of the low absolute values of drag reduction. As a typical example therefore, the behavior of a carboxymethyl cellulose (product D) is plotted in FIG. 4 as curve g. In the form of a 2% aqueous solution the carboxymethyl cellulose used had a viscosity of 3,000 Pa·s, measured in a falling ball viscosimeter according to Höppler. In this case $\Delta P_W/\Delta P_{DRA}$ was 1.25 at the beginning of the experiment and 1.14 after 400 minutes. It should be noted that the value $\Delta P_W/\Delta P_{DRA}=1$ means complete inefficiency. Drag reducing agents having a good effect, for example $\Delta P_W/\Delta P_{DRA}$ of 5 and simultaneously a good shearing stability have not yet been described.

EXAMPLE 2

Figure 5:
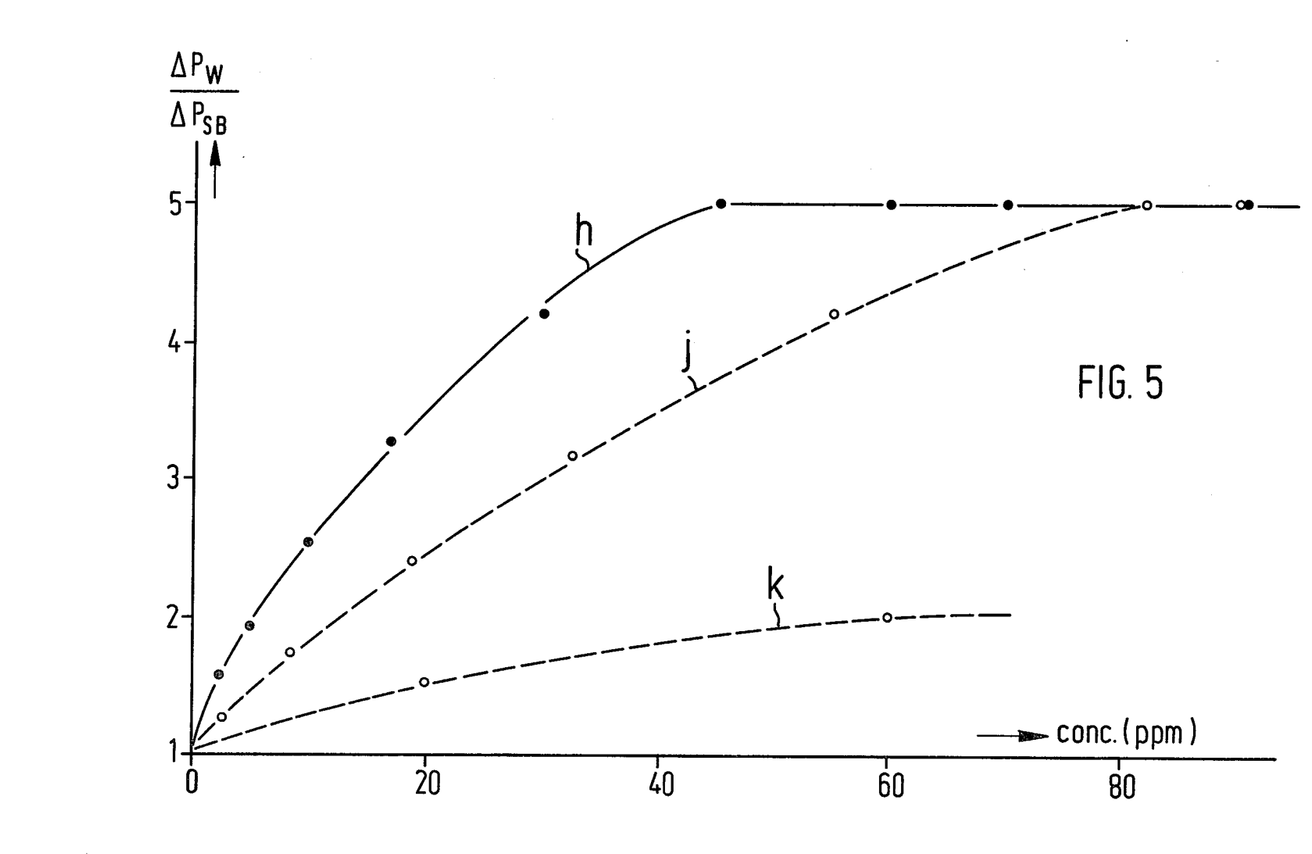
FIG. 5 is a further graph showing the drag reducing efficiency of DRAs of this invention plotted against concentration in ppm compared to a DRA outside of this invention.

Polymer I prepared as described in Example 1 and products A and C were tested in the flow apparatus as described above with the exception that the measured values with pipe A with a Reynold's number of 100,000 were recorded only after a period of pumping of 30 minutes. Within this period, products A and C had been decomposed to a certain extent. After said period, polymer I according to the invention (curve h in FIG. 5) still had its full effect with a concentration of 40 ppm ($\Delta P_W/\Delta P_{DRA}=5$) while the commercial polyacryl amide (product A) exhibited the same effect at a concentration of 80 ppm only (curve j). Even when used in a concentration of 100 ppm, polyethylene oxide (product C) hardly reached a value $\Delta P_W/\Delta P_{DRA}$ of 2.5 (curve k).

EXAMPLE 3

In a tubular reactor as specified in Example 2 of British Pat. No. 1,317,408, having a length of 3 m and an inside diameter of 20 cm and lined with polyethylene, an aqueous monomer solution containing 24.45% of acryl amide, 73.30% of water, 2.2% of sodium carbonate, 0.024% of N-p-totyl-sulfomethyl carbamic acid methyl ester, 0.024% of ammonium peroxidisulfate, 0.048% of di-n-butyl amine hydrochloride and 0.024% of copper acetyl acetonate solution (1 ml solution corresponded to 12.3 µg of Cu++) was polymerized. The jelly-like polymer (polymer II) issued at the lower end of the reactor through squeezing rolls. 38 g of polymer jelly were obtained per hour. It formed a limpid solution in water, had a degree of saponification of 10% by weight and a relative viscosity of 1.58 at 25° C., measured with an aqueous solution containing 1 mol of sodium nitrate and 0.05% by weight of the polymer. The resilience of the jelly was found to be 38%. The $\Delta P_W/\Delta P_{DRA}$ value, measured with a concentration of 60 ppm in the flow apparatus described above, was 5 at the beginning with Re being 100,000 and 3.4 after a time of circulation by pumping of 400 minutes.

EXAMPLE 4

Polymer I prepared as described in Example 1 was dissolved in a concentration of 30 ppm in a mixture of 60% by weight of finely ground limonite (iron ore) and 40% by weight of water and the suspension obtained was circulated by pumping in the described flow apparatus with Re=100,000 (in pipe B having a diameter of 3 cm). The relation of pressure loss $\Delta P_W/\Delta P_{DRA}$ was 3.7 at moment t=0, which means with the use of polymer I the pressure loss amounted to 1/3.7 or hardly one fourth of the pressure loss which would have been obtained without the use of the DRA in the apparatus.

EXAMPLE 5

A barge (open boat without engine) was loaded by a suction dredger with 150 tons of wet river sand and transported to a suitable place for discharge. To this end a pump boat whirled the sand up by means of two strong water jets and the slurry was suctioned off by a centrifugal pump. The sand slurry was then pressed through a pipe having a length of 142 m and a diameter of 0.25 m and conveyed to the area to be filled up. 60 minutes were required to empty the barge. The experiment was repeated, but this time a 0.5% by weight solution of the polymer I of Example 1 was pumped by means of a feeding pump into the pipe to the area to be filled up directly behind the suction pump. The stock solution of polymer I was prepared by dissolution of 60 kg of jelly granules of polymer I powdered with corn starch, containing 60% of water and having a particle size of 3 to 5 mm in 4,000 l of river water while stirring. The feeding pump was adjusted in such a manner that the concentration of DRA in the pipe was 50 ppm. Under these conditions, 31 minutes only were necessary to discharge the barge.

EXAMPLE 6

A cylindrical reaction vessel lined with polypropylene was charged with 938 ml of deionized water and, while stirring, 54.5 g of sodium carbonate and 312 g of acryl amide were dissolved therein. After having adjusted the temperature to 20° C. by means of a thermostabilized water bath and replaced the air in the vessel by gaseous nitrogen, 0.6 g of dibutyl amine hydrochloride, 0.3 ml of a copper acetyl acetonate solution (1 g of solution corresponded to 12.3 µg of Cu), 0.25 g of a compound of the formula and 0.25 g of ammonium peroxidisulate were added while stirring. After having discontinued stirring and removed the stirrer, the reaction mixture polymerized at 20° C. after an induction period of 58 minutes. The temperature rose to 92° C. The reaction mixture was then heated to 85° C. for a further 4 hours.

After cooling, a dimensionally stable, rubber-elastic polymer jelly (polymer III) was obtained having a resilience of 37.8%. The jelly was comminuted, dried and ground to give a pulverulent product which dissolved readily in water.

Figure 1:
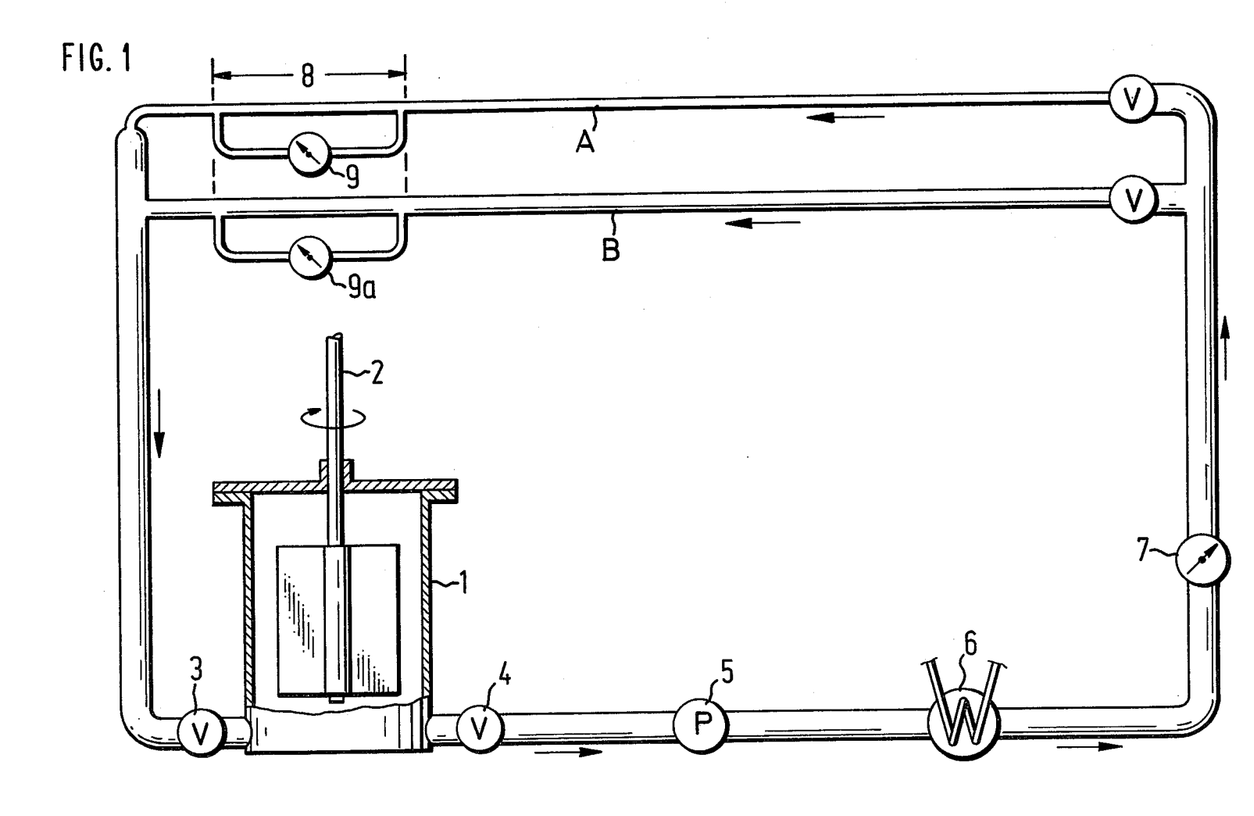
FIG. 1 is a schematic diagram of an apparatus for measuring the efficiency of the DRAs of this invention.

The apparatus used for testing drag reducing agents is shown in FIG. 1. For the test the substance to be tested is dissolved in container (1) using a blade stirrer (2), while valves (3) and (4) remain closed. After dissolution, the two valves are opened and the solution is pumped, by means of pump (5)—in the present case an adjustable mono-pump 2NE80 of Messrs. Netzsch—through heat exchanger (6) and flow meter (7), alternatively through pipe A or pipe B. After an appropriate time of flow the pressure drop is measured over a measuring distance (8) having a length of 1 meter using the differential pressure manometer (9) or (9a). After having passed the measuring distance, the liquid flows back into container (1) and is recycled again.

Pipes A and B have a length of 6 meters, pipe A has an internal diameter of 1.4 cm and pipe B one of 3.0 cm.

The pressure drop in measuring distance (8) is an especially simple measure to evaluate the efficiency of a DRA. In order to become independent of the special dimensions of the apparatus, the relation m of the pressure drop of pure water to that obtained with a solution of a flow accelerator is chosen as measure for the efficiency of a DRA, i.e.

$$m = \Delta P_W / \Delta P_{DRA}$$

wherein $\Delta P_W$ denotes the pressure drop with pure water and $\Delta P_{DRA}$ denotes the pressure drop with the solution of DRA.

The higher the relation of pressure drop, the better the efficiency of the DRA.

The shearing stability of a DRA, i.e. its resistance against decomposition in high shearing gradients, as they occur especially in pumps, is simply tested by pumping the solution of the DRA through the flow apparatus for a prolonged period of time. The time necessary for reducing the initial relation of the pressure drop to a definite value, for example 50% or 10% of the initial value, is a direct (relative) measure for the shearing stability.

The following examples illustrate the invention.

EXAMPLE 1

A reaction vessel lined with polyethylene was charged with 750 cc of fully desalted water and, while stirring, 250 g of acryl amide, 66.6 g of potassium carbonate, 0.5 g of dibutyl amine hydrochloride, 0.25 g of ammonium peroxidisulfate and 0.25 g of a compound of the formula were dissolved therein. After removal of atmospheric oxygen by introducing nitrogen, the reaction mixture polymerized. With an initial temperature of 20° C., the temperature rose to 90° to 95° C. during the course of one hour. The polymerization mixture was not mixed mechanically. The polymer obtained represented a dimensionally stable, rubber-elastic jelly capable of being cut. It had a resilience of 40%, measured as described above, and the degree of saponification, determined by titration of the carboxyl groups, was found to be 27% by weight. The jelly (polymer I) dissolved in water without residue.

Figure 3:
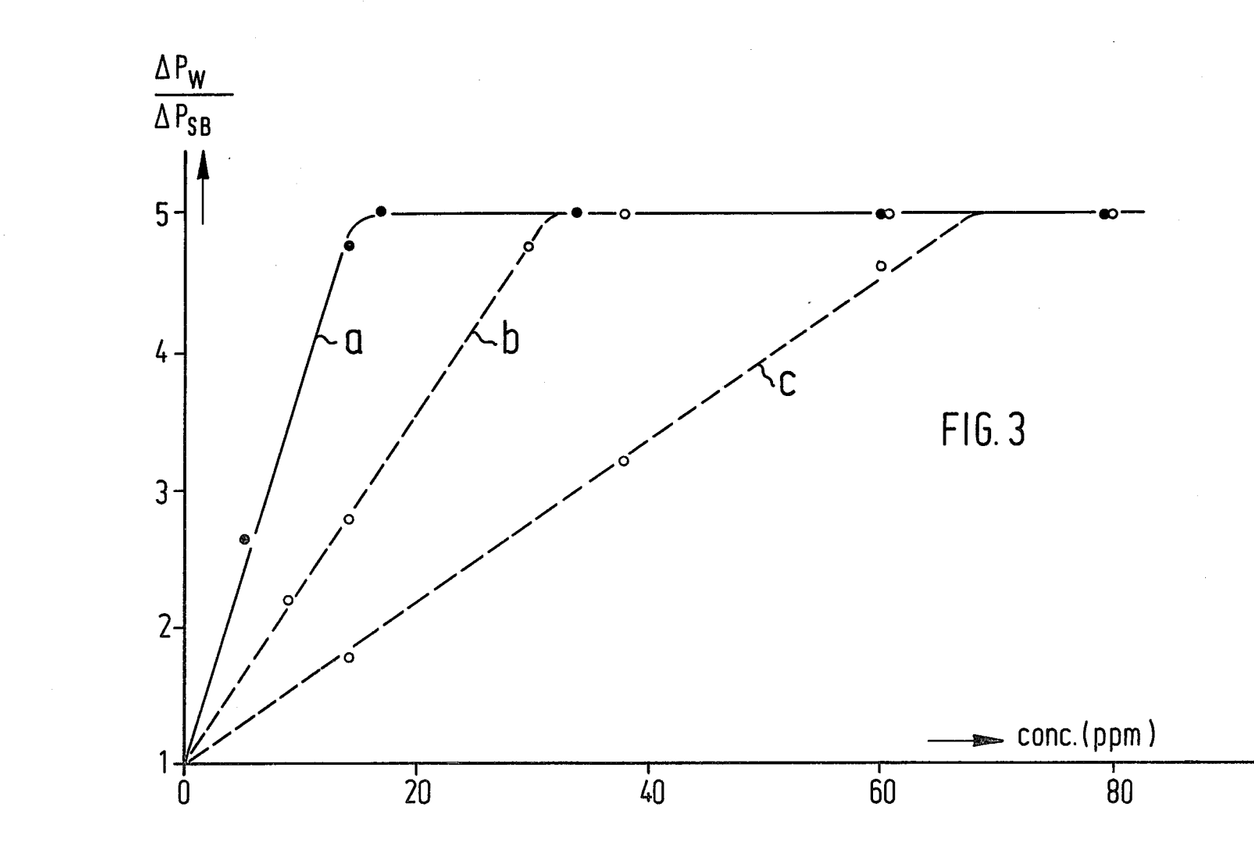
FIG. 3 is a graph showing the drag reducing efficiency of the DRAs of this invention plotted against their concentration in ppm.

The drag reducing effect of the jelly, measured in the apparatus described above and expressed by the relation of the pressure loss as defined above is plotted in FIG. 3 as curve a in dependence on the concentration. The measured values were obtained directly after having started the experiment in tube A (diameter 1.4 cm) and with a Reynold's number Re of 100,000, at the moment t=0 at which a decomposition has not yet taken place. The effect increased with concentrations from 0 to 17 ppm (=gram of DRA per cubic meter of water). With a concentration exceeding 17 ppm a further improvement could not be observed. The final value with 17 ppm is m=5, i.e. the pressure loss with DRA is 1/5 only of the pressure loss of pure water. For comparison, there is plotted in FIG. 3 as curve b the effect of a polyacryl amide (product A) known to be a good DRA and commercially available by the name of "SEPARAN AP 273®" (cf. BHRA Fluid Engineering ISBNO 900983 71X1977, pages B3-37 to B3-50, especially page B3-39, paragraph 5). This anionic polyacryl amide available in powder form, produced by polymerization in a dilute solution, reached its full effect at a concentration of 34 ppm only. Thus, only half the amount of the polymer I according to the invention was necessary to obtain the same effect. Curve c illustrates the effect of another polyacryl amide obtainable on the market by the name of BOZEFLOC A 41® (product B) (cf. Instruction Sheet A No. 8601 of Benckiser Knapsack GmbH, Ladenburg, Federal Republic of Germany), which product has a still poorer effect.

Figure 4:
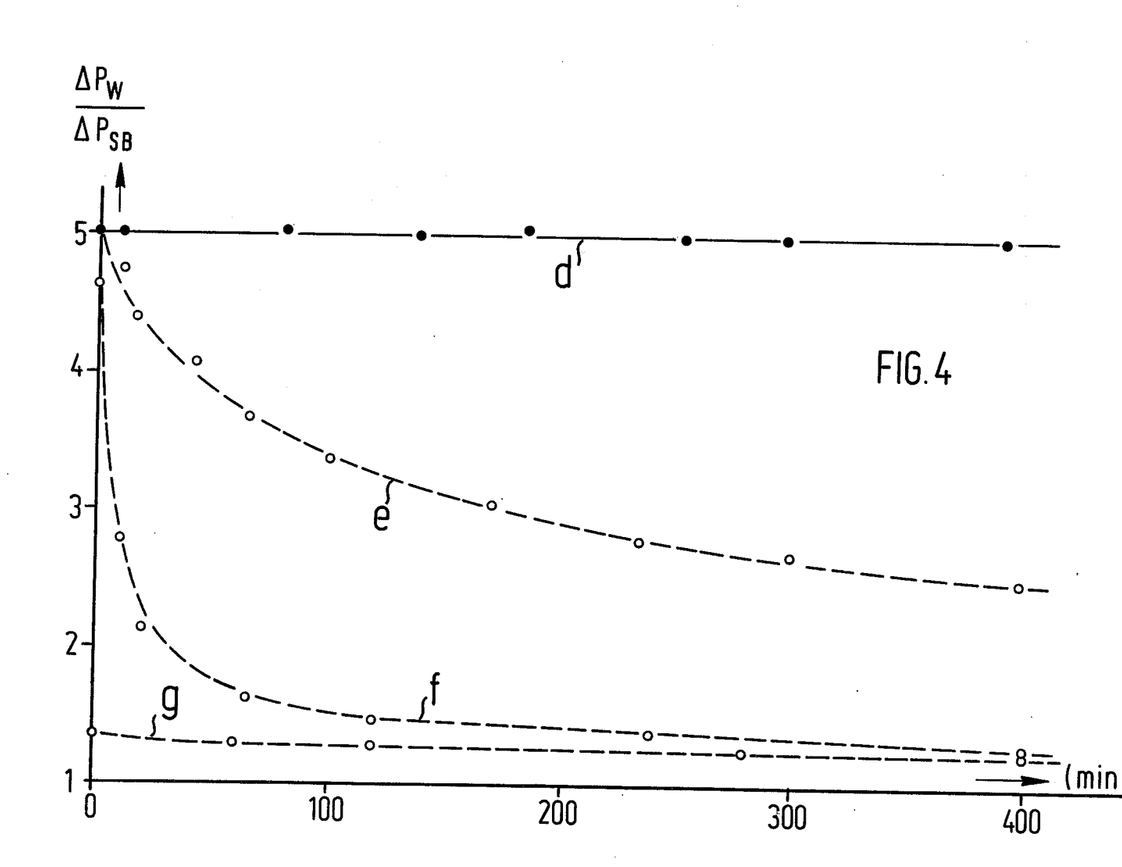
FIG. 4 is another graph showing the drag reducing efficiency of DRAs of this invention plotted against shearing stability in minutes compared to DRAs outside the invention.

The low concentration to be used of the polymers according to the invention is not their sole advantage. Surprisingly, the products are characterized by a shearing stability that has not yet been reached. FIG. 4 illustrates the results of a decomposition test in which aqueous solutions of a concentration of 60 ppm were circulated by pumping in the apparatus described above for a prolonged period of time. The concentration of 60 ppm was chosen since this is the concentration at which the DRAs used for comparison display their maximum effect. The experiment was carried out with pipe A (diameter 1.4 cm) and a Reynold's number Re of 100,000. After a pumping time of 400 minutes, polymer I according to the invention was still completely unaltered (curve d), while other polymers used for comparison were substantially decomposed (curve e=product A; curve f=polyethylene oxide (product C) according to the Journal of Applied Polymer Science, volume 18 (1974), pages 3403 to 3421, especially page 3406 last The drag reducing effect of polymer III in comparison with commercial polyacryl amides B and C was tested at a concentration of 15 ppm and at Re=100,000 in the flow apparatus described above. The results obtained, represented by the relation of pressure loss $m = \Delta P_W/\Delta P_{DRA}$, are summarized in the following table. It should be kept in mind that a value of $m=1$ means a complete inefficiency as DRA. For comparison the degree of saponification in % by weight and the relative viscosity ($\eta_{rel}$) of the products are likewise indicated in the table. The relative viscosities were measured at 25° C. in an aqueous solution containing 1 mol per liter of sodium nitrate and 0.05% by weight of the polyacrylamide.

|  | degree of saponification % by weight | $\eta$rel | m |
|---|---|---|---|
| polymer III | 12 | 1.82 | 4.2 |
| product B | 30 | 1.84 | 1.8 |
| product C | 30 | 1.80 | 1.0 |

The results show the clear superiority of polymer III according to the invention as DRA as compared to commercial polyacryl amides (product B and C) with an approximately equal relative viscosity of the tested products.

We claim:

1. Process for reducing the friction pressure drop of aqueous liquids and suspensions in turbulent or pulsating flow by adding from 1 to 1,000 ppm of a polyacrylamide as drag reducing agent, which comprises using as drag reducing agent a polyacryl amide or partially saponified polyacrylamide which has been obtained by a polymerization reaction of acryl amide carried out without stirring in an about 15 to 30% by weight aqueous solution the reaction being started at an initial temperature of about 10° to 30° C. and completing the reaction at about 70° to 98° C. resulting in a polymer in the form of an aqueous, dimensionally stable jelly which has retained a solubility in water and is capable of being cut and which has an elastic resilience of 5% to about 80%.

2. The process of claim 1, wherein the jelly used as drag reducing agent is a polyacryl amide having a degree of saponification of from 20 to 40% by weight.

3. The process of claim 1, wherein the elastic resilience of 5% to about 80% is obtained by applying the jelly-like polyacryl amide or saponified polyacryl amide in a 1 cm thick layer on a steel plate and testing it with a falling steel ball having a diameter of 5 mm.

4. The process of claim 3, wherein the drag reducing agent used has an elastic resilience of from 25 to 45%.

5. The process of claim 1, wherein from 10 to 100 ppm of the drag reducing agent are added to the aqueous liquid or suspension.

6. The process of claim 1, wherein the drag reducing agent is added to the main flow of the aqueous liquid or suspension in the form of an aqueous stock solution.

7. The process of claim 6, wherein the aqueous stock solution of the drag reducing agent is prepared by dissolving small particles of the polyacryl amide or partially saponified polyacryl amide having a diameter of from about 0.2 to 5 mm.

8. The process of claim 1, wherein the drag reducing agent added to the main flow of the aqueous liquid or suspension in the form of an aqueous suspension.

9. The process of claim 1, wherein the drag reducing agent is added to the main flow of the aqueous liquid or suspension in the form of a dry powder.

* * * * *